(12) United States Patent
Yokoyama et al.

(10) Patent No.: US 9,586,641 B2
(45) Date of Patent: Mar. 7, 2017

(54) STEP STRUCTURE FOR A SADDLE-RIDE VEHICLE, AND VEHICLE INCLUDING SAME

(71) Applicant: HONDA MOTOR CO., LTD., Minato-Ku, Tokyo (JP)

(72) Inventors: Yuichi Yokoyama, Wako (JP); Tetsuya Nakazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/806,716

(22) Filed: Jul. 23, 2015

(65) Prior Publication Data
US 2016/0031512 A1 Feb. 4, 2016

(30) Foreign Application Priority Data
Jul. 30, 2014 (JP) .................. 2014-155526

(51) Int. Cl.
*B62J 25/00* (2006.01)
(52) U.S. Cl.
CPC ..................... *B62J 25/00* (2013.01)
(58) Field of Classification Search
CPC .................... B62J 25/00; B62J 9/00
USPC ..................... 280/291, 163; 74/564
See application file for complete search history.

(56) References Cited

U.S. PATENT DOCUMENTS

| | | | | |
|---|---|---|---|---|
| 4,456,090 A * | 6/1984 | Malenotti | ................ | B62J 25/00 180/219 |
| 6,688,629 B2 * | 2/2004 | Essinger | ................. | F02B 61/02 180/219 |
| 7,114,739 B2 * | 10/2006 | Colano | .................... | B62J 25/00 280/166 |
| 9,278,722 B2 * | 3/2016 | Yokoyama | ............... | B62J 25/00 |
| 2009/0020980 A1 * | 1/2009 | Owyang | .................. | B62J 25/00 280/291 |
| 2016/0052581 A1 * | 2/2016 | Seo | ........................... | B62J 6/04 224/413 |
| 2016/0052586 A1 * | 2/2016 | Kunisada | ........... | F01N 13/1805 280/830 |

FOREIGN PATENT DOCUMENTS

| | | | | |
|---|---|---|---|---|
| EP | 2055622 | * | 11/2008 | ............. B62J 25/00 |
| EP | 2500247 | * | 9/2012 | ............... B62J 9/00 |
| GB | 372260 | * | 5/1932 | |
| JP | S62-61888 A | | 3/1987 | |
| JP | 4-278889 | * | 10/1992 | ............. B62J 25/00 |

* cited by examiner

*Primary Examiner* — Anne Marie Boehler
(74) *Attorney, Agent, or Firm* — Carrier Blackman & Associates, P.C.; Joseph P. Carrier; Jingli Wang

(57) ABSTRACT

A step structure of a saddle-ride type vehicle is configured to permit easy adjustment of a position and also of an angle of a step. A pair of opposed clamp pieces, that are formed as part of a step-support bracket provided to a vehicle body of a saddle-ride vehicle, are provided to sandwich an eccentric collar (rotor) from both sides thereof in a radial direction. The clamp pieces are configured to be tightened against the eccentric collar by a bolt, thereby non-rotatably fixing a position of the eccentric collar. The eccentric collar is configured such that when the clamp pieces are loosened, a shaft part of a step is pivotally movable in relation to a shaft insertion hole, and the step, supported by the shaft insertion part, can be adjustably rotated in relation to the step-support bracket.

18 Claims, 6 Drawing Sheets

STEP STRUCTURE FOR A SADDLE-RIDE VEHICLE, AND VEHICLE INCLUDING SAME

CROSS-REFERENCE TO RELATED APPLICATIONS

The present invention claims priority under 35 USC 119 based on Japanese patent application No. 2014-55526, filed on Jul. 30, 2014. The entire subject matter of this priority document, including specification claims and drawings, is incorporated by reference herein.

BACKGROUND OF THE INVENTION

Technical Field of the Invention

The present invention relates to a step structure for a saddle-ride vehicle such as a motorcycle.

Background Art

In a motorcycle, a step for placing each foot of an occupant is frequently provided on a vehicle frame through a bracket. Such a known step is described in Japanese Patent Literature 1, JP-A No. S62-61888.

Patent Literature 1 discloses a step structure in which a rotor, rotatably retained, is provided to a bracket and a step (footrest) projecting lateral to a vehicle body is provided in a position deviating from a rotational center of the rotor. With this structure, by rotating the rotor, a position of the step is moved around the rotational center of the rotor, and the position of the step can be adjusted.

With the structure disclosed in Patent Literature 1, the rotor is retained in a retaining hole formed in the bracket. In the bracket, for example, a side of an outer periphery of the retaining hole is cut. Thereby, a periphery of the retaining hole can be elastically deformed. With the rotor retained in the retaining hole, when cut edges on both sides in a cutting position of the bracket are fastened to each other by a bolt, an inner peripheral surface of the retaining hole and an outer peripheral surface of the rotor are brought into pressure contact with each other, and rotation of the rotor is prevented. On the other hand, when the bolt is unfixed, the bracket is elastically deformed in a direction where the cut edges on both the sides in the cutting position are separated from each other, and the rotor can be rotated in the retaining hole.

Also, the step has a support shaft (bolt shaft) that is inserted into a mounting hole bored in a position deviating from the rotational center of the rotor. The support shaft is fastened and fixed to the rotor by fitting a nut at a shaft end. Thereby, when the nut is unfixed, the step can be rotated around the mounting hole of the rotor. On the other hand, when the nut is fastened, the step is non-rotatably fixed to the mounting hole of the rotor.

In the above-described known art, when the position of the step is adjusted, the bolt is unfixed to rotate the rotor in the retaining hole of the bracket, so that the position of the step is changed. At this time, a mounting angle of the step is changed in association with the rotation of the rotor, thereby creating a need to unfix the nut for fixing the step and to adjust an angle of the step according to the position of the step.

In this way, the mutually different fastening members must be unfixed or fastened by changing the position of the step and adjusting the angle of the step. For this reason, there is such a problem that work is complicated.

Although the known steps for motorcycles and other saddle-ride vehicles are usable for their intended purposes, a need still exists in the art for an improved step for a saddle-ride vehicle, which will permit easy adjustment of the position of the step and the angle of the step,

SUMMARY OF THE INVENTION

The present invention has been accomplished in view of the above-mentioned circumstances, and an object of the present invention is to provide a step structure for a saddle-ride vehicle, in which the position and angle of the step can easily be adjusted.

Throughout the present specification, reference numbers are used to refer to the exemplary structures shown in the drawings, and such numbers are intended to illustrate, rather than to limit the invention.

In order to accomplish the above-mentioned object, according to a first aspect of the invention, there is provided a step structure for a saddle-ride vehicle, including: a bracket (30) that is provided on a vehicle body of the saddle-ride vehicle (1); a rotor (40) that is rotatably retained by the bracket (30) around a shaft extending in a vehicle width direction; a pair of clamp members (35, 36) that are formed with respect to the bracket (30) and that are provided to sandwich the rotor (40) from both sides in a radial direction of the rotor (40); a fastening member (43) that fastens the pair of clamp members (35, 36) to each other; a step-receiving aperture (44) that is provided with respect to the rotor (40) and that is formed to be offset with respect to a rotational center (C2) of the rotor (40); and a step (19) that has a support shaft (62c) extending in the vehicle width direction and inserted into the step-receiving aperture (44), and a step body (61) projecting outward in the vehicle width direction from the support shaft (62c). The pair of clamp members (35, 36) non-rotatably fixes the rotor (40) by being fastened by the fastening member (43). The rotor (40) is configured in such a manner that with the rotor (40) non-rotatably fixed by fastening of the fastening member (43), the support shaft (62c) of the step (19) is non-rotatably fixed by the step-receiving aperture (44), and with the fastening of the fastening member (43) canceled and the rotor (40) unfixed, the step (19) supported by the step-receiving aperture (44) is rotated around the support shaft (62c).

According to a second aspect of the invention, in the step structure for the saddle-ride vehicle according to the first aspect, the rotor (40) has a pair of step fixing parts (46A, 46B) that are provided to sandwich the support shaft (62c) inserted into the step-receiving aperture (44) from both the sides in the radial direction, and the pair of step fixing parts (46A, 46B) is configured in such a manner that with the rotor (40) non-rotatably fixed by the pair of clamp members (35, 36), the support shaft (62c) is non-rotatably fixed while sandwiching the support shaft (62c).

According to a third aspect of the invention, in the step structure for the saddle-ride vehicle according to the second aspect, an interval W1 between the pair of clamp members (35, 36) and an interval W2 between the pair of step fixing parts (46A, 46B) have a relationship of "W1≥W2".

According to a fourth aspect of the invention, in the step structure for the saddle-ride vehicle according to any one of the first through third aspects, a groove part (48) continuing in a peripheral direction is formed in an outer peripheral part of the rotor (40), and the fastening member (43) attached to the bracket (30) is entered into the groove part (48).

According to a fifth aspect of the invention, in the step structure for the saddle-ride vehicle according to any one of the first to fourth aspects, the step structure for the saddle-ride vehicle further includes a mounting member support part (50) for supporting a mounting member (SB) mounted on the vehicle body. The mounting member support part (50) is rotatably provided between a storage state where the mounting member support part (50) is stored in a position overlapping with the bracket (30) in a side view and a usage state where the mounting member support part (50) projects from the bracket (30) to support the mounting member (SB).

According to a sixth aspect of the invention, in the step structure for the saddle-ride vehicle according to the fifth aspect, the rotor (40) has a rotation support part (40g) that projectingly extends inward in the vehicle width direction from the bracket (30) and that rotatably supports the mounting member support part (50).

According to a seventh aspect of the invention in claim 7, in the step structure for the saddle-ride vehicle according to the sixth aspect, a projecting part (47) projecting to a side of an outer periphery is formed at an end of the rotation support part (40g) on an inner side in the vehicle width direction, and the mounting member support part (50) is rotatably supported while movement thereof in the vehicle width direction is restricted, between the bracket (30) and the projecting part (47).

According to an eighth aspect of the invention, in the step structure for the saddle-ride vehicle according to any one of the first through seventh aspects, the step body (61) is formed as a folding type with respect to the support shaft (62c), and the support shaft (62c) is configured in such a manner that with the support shaft (62c) inserted into the step-receiving aperture (44), while the movement thereof in the vehicle width direction is restricted by a vehicle-width-direction movement restriction member (60), the support shaft (62c) is rotatably supported around the support shaft (62c).

According to a ninth aspect of the invention, in the step structure for the saddle-ride vehicle according to any one of the first through eighth aspects, a turning angle of the support shaft (62c) around the support shaft (62c) is positioned in a stepwise fashion.

Advantageous Effects of Invention

With the invention according to the first aspect hereof, when the pair of clamp members is fastened by the fastening member, the rotor is non-rotatably fixed, and also the support shaft of the step is non-rotatably fixed by the step-receiving aperture. Also, when the fastening of the pair of clamp members by the fastening member is canceled, the rotor is unfixed, and also the step supported by the step-receiving aperture can be rotated around the support shaft. In this way, both the fixing and unfixing of the step can be performed by the fastening member for fixing and unfixing the rotor. For this reason, the position and angle of the step can be easily adjusted.

With the invention according to the second aspect, when the pair of clamp members is fastened by the fastening member, the support shaft is sandwiched between the pair of step fixing parts, so that the support shaft can be non-rotatably fixed. Also, in comparison with the case that a complicated chuck mechanism is used, a structure of the rotor can be simplified.

With the invention according to the third aspect, when the pair of clamp members is fastened, the support shaft is sandwiched between the pair of step fixing parts, so that the support shaft can be certainly non-rotatably fixed. For this reason, the fixing of the rotor and the fixing of the step can be reliably performed.

With the invention according to the fourth aspect, since the fastening member is entered into the groove part, while the movement of the rotor in the vehicle width direction is restricted, the rotor can be rotated.

With the invention according to the fifth aspect, when the mounting member support part is rotated from the storage state so as to be brought into the usage state, the mounting member such as a side bag and a pannier case can be supported by the mounting member support part. Also, when the mounting member support part is not used, the mounting member support part is rotated from the usage state so as to be brought into the storage state, and is stored in a position overlapping with the bracket. For this reason, appearance quality can be improved.

With the invention according to the sixth aspect, since the mounting member support part is rotatably supported by the rotor, the number of components is reduced, so that the structure can be simplified, and a reduction in costs can be achieved.

With the invention according to the seventh aspect, since the projecting part is provided at the end of the rotor on the inner side in the vehicle width direction, the mounting member support part can be rotatably supported between the bracket and the projecting part. For this reason, also in view of this, the number of components is reduced, so that the structure can be simplified, and the reduction in costs can be achieved.

With the invention according to the eighth aspect, the support shaft of the step is rotatably supported while the movement thereof in the vehicle width direction is restricted by the vehicle-width-direction movement restriction member. Also, for this reason, the structure can be simplified, and the reduction in costs can be achieved.

With the invention according to the ninth aspect, the rotational angle of the support shaft can be easily positioned, and the angle of the step can be easily adjusted.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

Figure 1:
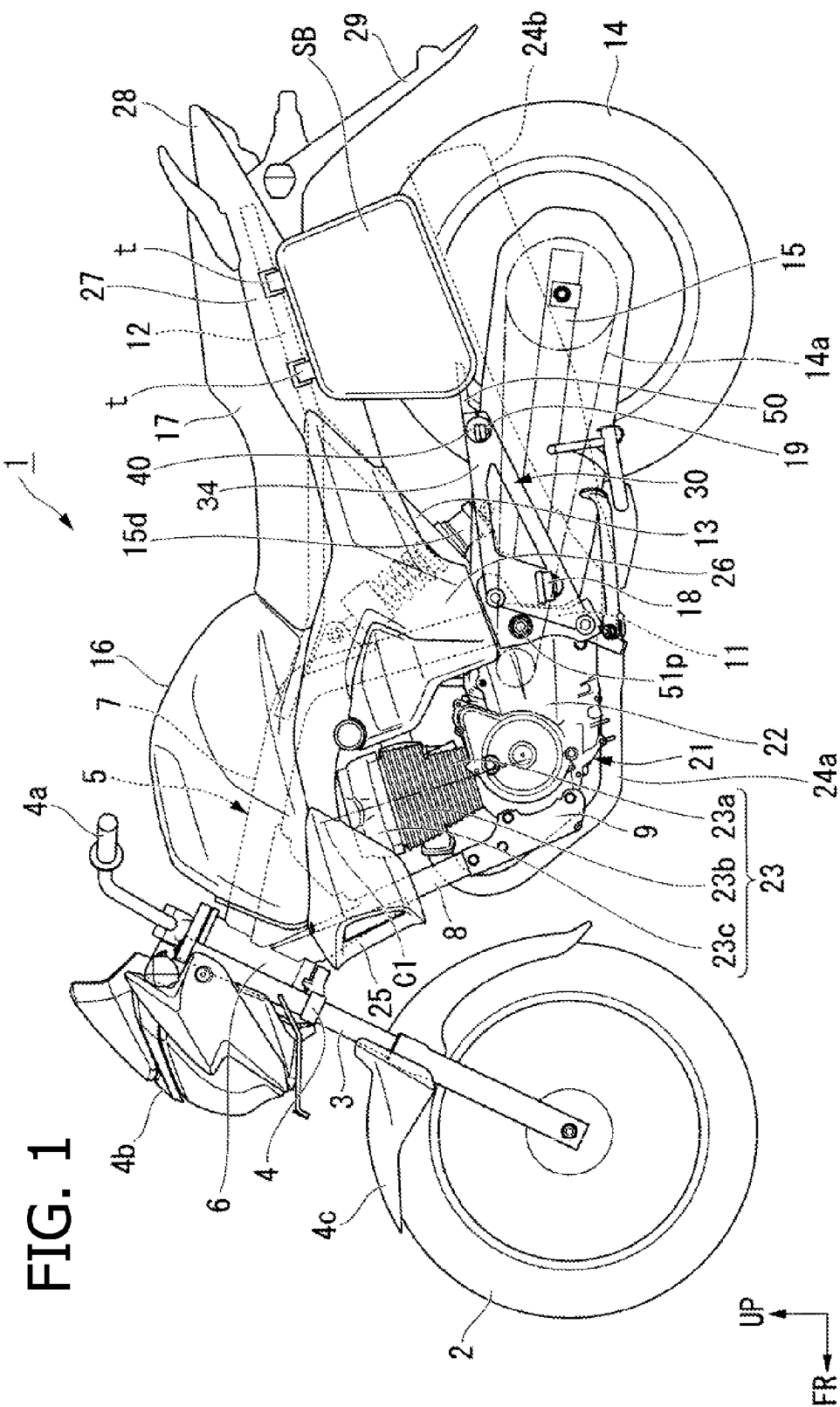
FIG. 1 is a left side view of a motorcycle including a step apparatus according to a selected illustrative embodiment of the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Also, in proper places in the drawings used for the following explanation, an arrow FR is indicative of a front side of the vehicle, an allow LH is indicative of a left side of the vehicle, and an arrow UP is indicative of an upper side of the vehicle.

In a motorcycle (saddle-ride vehicle) 1 shown in FIG. 1, a front wheel 2 of the motorcycle is rotatably attached to lower ends of a pair of right and left front forks 3. Upper parts of the right and left front forks 3 are steerably pivotally supported on a head pipe 6 at a front end of a vehicle body frame 5 through a steering shaft 4. A steering handlebar 4a is attached above the steering stem 4. A front cowl 4b is attached in front of the steering shaft 4.

The vehicle body frame 5 is formed by integrally combining a plurality of frame members, formed from different kinds of steels with each other by welding or the like.

The vehicle body frame 5 has a single main frame 7 that extends obliquely downward and rearward from a rear side of an upper part of the head pipe 6, and that subsequently extends while being bent downward. The vehicle body frame 5 also includes a single down frame 8 that extends obliquely downward and rearward from a rear side of a lower part of the head pipe 6, a hanger bracket 9 that is connected to a lower end of the down frame 8, and a pivot bracket 11 that is provided at a rear lower end of the main frame 7.

The vehicle body frame 5 further includes a pair of right and left seat rails 12 that extend rearward from a rear side of a bent portion of the main frame 7, and a pair of right and left support pipes 13 that extend obliquely upward and rearward from a rear side of the pivot bracket 11 toward lower sides of longitudinal intermediate portions of the right and left seat rails 12.

A rear wheel 14 of the motorcycle 1 is rotatably attached to a rear end of a swing arm 15, that extends in a longitudinal direction on a lower rear part of the vehicle body. A front end of the swing arm 15 is vertically swingably supported pivotally on the pivot bracket 11 located in a longitudinal intermediate part of the vehicle body frame 5 through a pivot shaft 51p. A rear part of the swing arm 15 is coupled to a lower end of a suspension part 15d having an upper end coupled to the vehicle body frame 5 directly or through an appropriate arm member.

The rear wheel 14 is coupled to an engine 21 as a motor for the motorcycle 1 through, for example, a chain transmission mechanism 14a disposed on a left side of the rear part of the vehicle body.

In the engine 21, a cylinder 23 is raised up above a front part of a crankcase 22 composing a lower part of the engine. In the cylinder 23, a cylinder body 23a, a cylinder head 23b, and a head cover 23c are stacked in order from a side of the crankcase 22. A reference sign C1 in the drawing is indicative of a cylinder axis arranged along a raising direction of the cylinder 23. A fuel tank 16 is arranged above the cylinder 23, and a seat 17 is arranged behind the fuel tank 16. A reference sign 18 in the drawing is indicative of a main step (step) for a rider, and a reference sign 19 is indicative of a pillion step (step) for a pillion passenger seated on the rear.

An exhaust pipe 24a is connected to a front part of the cylinder head 23b. The exhaust pipe 24a is bent while striding a front side and a lower side of the engine 21, and extends rearward. A muffler 24b is connected to a rear end of the exhaust pipe 24a. The muffler 24b is arranged on a right side of the rear part of the vehicle body, and extends obliquely upward and rearward from a lower side of the main step 18. A reference sign SB in the drawing is indicative of each of side bags that are detachably supported on right and left sides of the rear side of the vehicle body.

Various kinds of synthetic resin covers are attached to a periphery of the vehicle body of the motorcycle 1. Specifically, the front cowl 4b is attached to the steering stem 4. A front fender 4c is attached between the right and left front forks 3. Right and left shrouds 25 are attached to right and left sides of the front part of the vehicle body frame 5. Right and left side covers 26 are attached to right and left sides of the longitudinal intermediate part of the vehicle body frame 5. Right and left rear side covers 27 are attached to right and left sides of the rear part of the vehicle body frame 5. A rear end cover 28 is attached to a rear end of the vehicle body frame 5. A rear fender 29 is attached below the rear end of the vehicle body frame 5.

Figure 2:
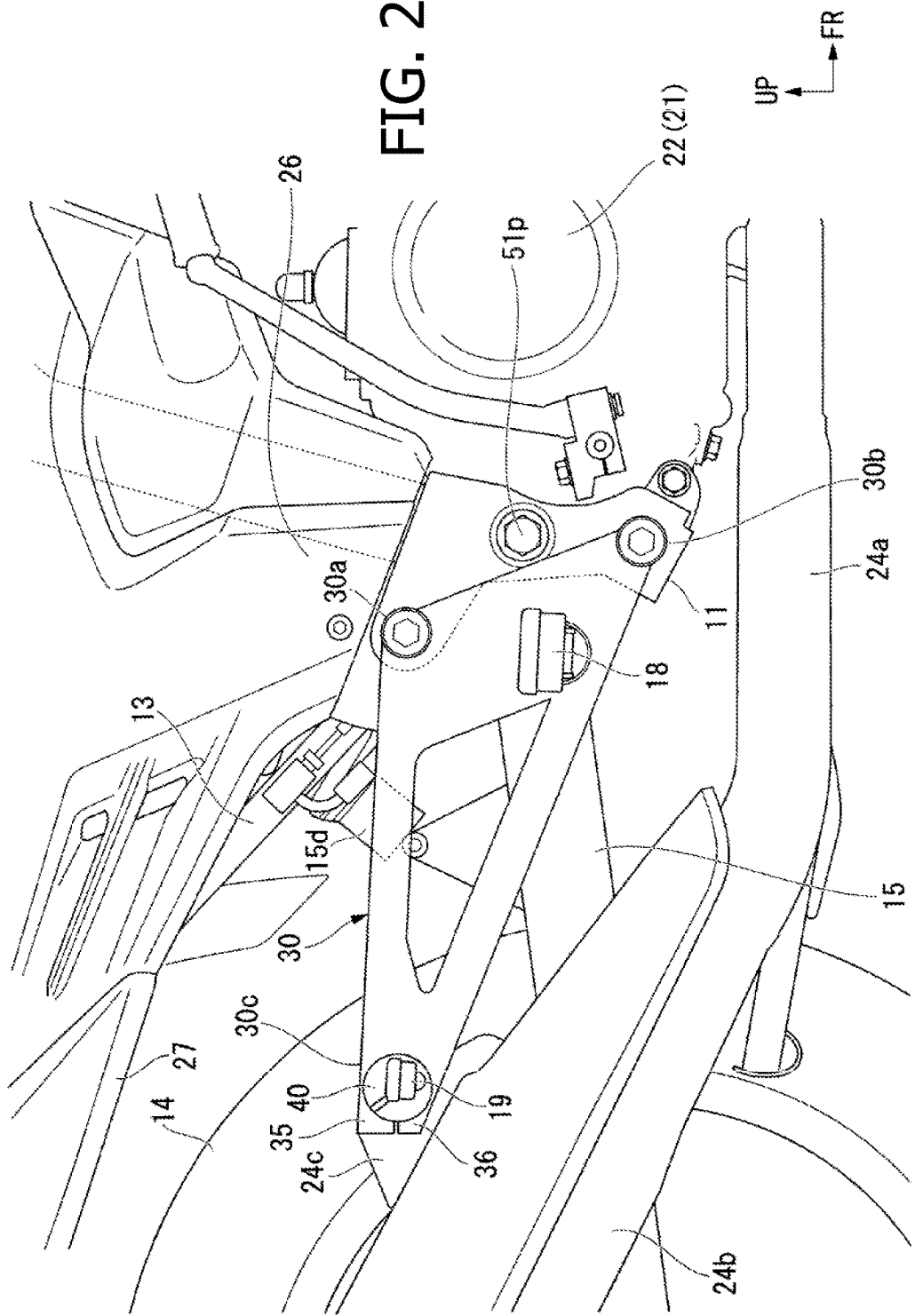
FIG. 2 is a right side view of an area around a step of the motorcycle.

With reference to FIG. 2 together, the right and left main steps 18 and the right and left pillion steps 19 are respectively supported on a side surface of the pivot bracket 11 through right and left step-support brackets 30.

Hereinafter, the right step-support bracket 30 (hereinafter merely referred to as the step-support bracket 30) of the right and left step-support brackets 30 will be exemplarily described. The left step-support bracket 30 has the same structure as the right step-support bracket 30 except for the fact that the left bracket has a symmetric mirror-image shape with respect to the right step-support bracket 30. For this reason, detailed description of the left bracket is omitted.

Figure 3:
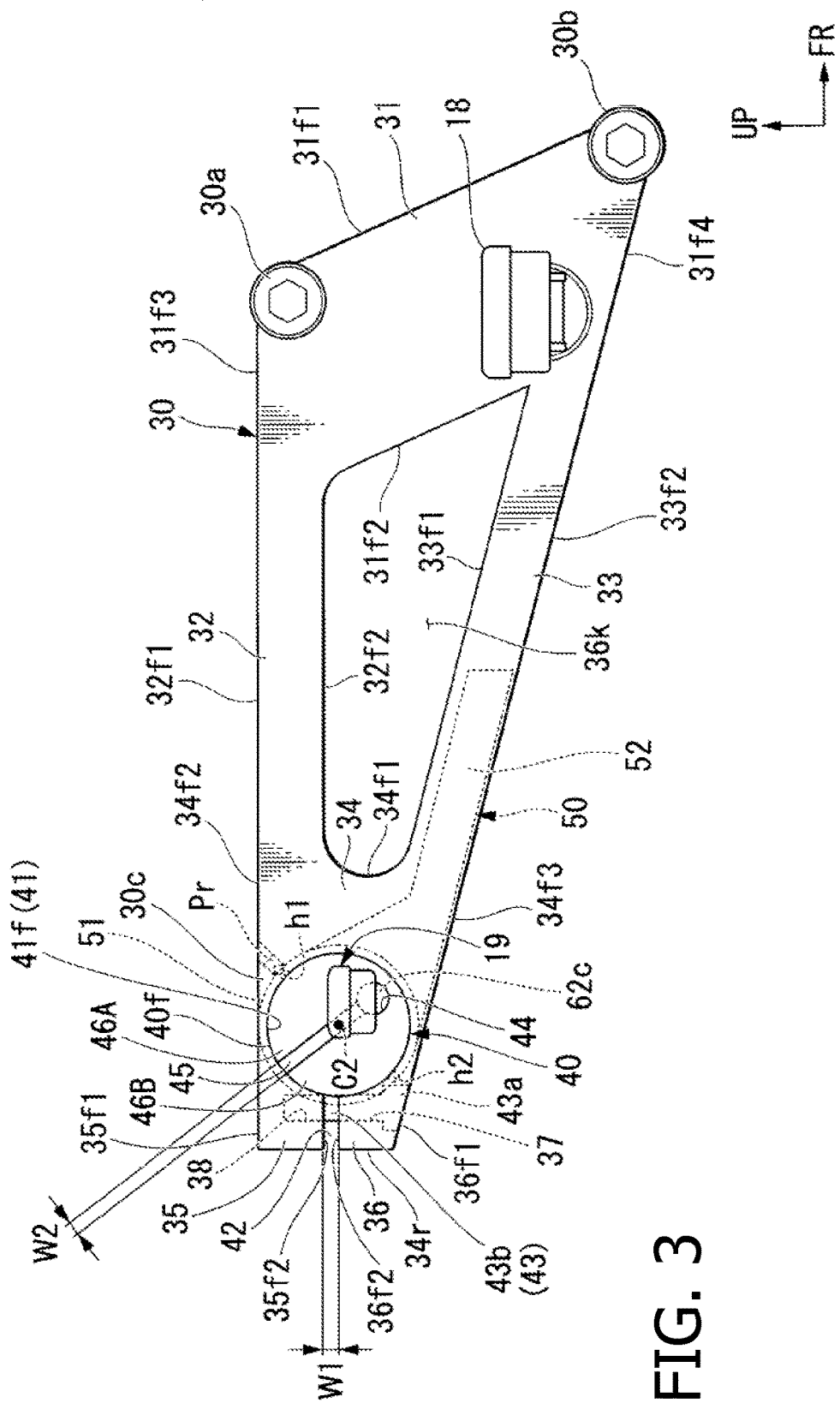
FIG. 3 is a right side view of a bracket for supporting the step.

As shown in FIG. 2 and FIG. 3, the step-support bracket 30 has a front wall part 31 composing a front end of the bracket, an upper wall part 32 and a lower wall part 33 that extend rearward of the front wall part 31, and a joint part 34 for joining together respective rear ends of the upper wall part 32 and the lower wall part 33. The step-support bracket 30 is integrally formed by molding using metal such as iron and aluminum alloy.

A front upper end 30a of the front wall part 31 is fastened and fixed to an upper part of a right end of the pivot bracket 11 by a bolt. A front lower end 30b of the front wall part 31 is fastened and fixed to a lower part of the right end of the pivot bracket 11 by a bolt.

The front wall part 31 obliquely vertically extends so that an upper side thereof is positioned rearward of the vehicle body with respect to a vertical direction of the vehicle. A front surface 31f1 and a rear surface 31f2 of the front wall part 31 are substantially parallel to each other. The front wall part 31 has a substantially constant width (a distance between the front surface 31f1 and the rear surface 31f2) in the longitudinal direction of the vehicle, and also has a substantially constant thickness in the vehicle width direction.

The upper wall part 32 substantially horizontally extends rearward from the upper rear end of the front wall part 31. A front end of the upper wall part 32 is integrally connected to the upper rear end of the front wall part 31. An upper surface 32f1 and a lower surface 32f2 of the upper wall part 32 are substantially parallel to each other. The upper wall part 32 has a substantially constant width (a distance between the upper surface 32f1 and the lower surface 32f2) in the vertical direction of the vehicle, and also has a substantially constant thickness in the vehicle width direction.

The lower wall part 33 extends rearward so as to be directed upward to the rear from a lower rear end of the front wall part 31. A front end of the lower wall part 33 is integrally connected to the lower rear end of the front wall part 31. An upper surface 33f1 and a lower surface 33f2 of the lower wall part 33 are substantially parallel to each other. The lower wall part 33 has a substantially constant width (a distance between the upper surface 33f1 and the lower surface 33f2) in the vertical direction of the vehicle, and also has a substantially constant thickness in the vehicle width direction.

The joint part 34 is formed to be projected rearward of the vehicle so that a rear side thereof is small in a vertical width with respect to the longitudinal direction of the vehicle. A front surface 34f1 of the joint part 34 at a front end in the vertical center is formed in a curved shape that is projected rearward. An upper front end of the joint part 34 is integrally connected to a rear end of the upper wall part 32. A lower front end of the joint part 34 is integrally connected to a rear end of the lower wall part 33. The joint part 34 has a substantially constant thickness in the vehicle width direction.

The front surface 31f1 of the front wall part 31 is formed in an inclined surface that is inclined so as to face a front upper side. An upper surface 31f3 of the front wall part 31, the upper surface 32f1 of the upper wall part 32, and an upper surface 34f2 of the joint part 34 are substantially flush with each other, and as a whole, form a substantially horizontal surface. A lower surface 31f4 of the front wall part 31, the lower surface 33f2 of the lower wall part 33, and a lower surface 34f3 of the joint part 34 are substantially flush with each other, and as a whole, form an inclined surface that is inclined so as to face a rear lower side. With this arrangement, the step-support bracket 30 is formed in a triangular shape that is projected rearward in a right side view.

The front wall part 31, the upper wall part 32, the lower wall part 33, and the joint part 34 respectively have substantially the same thickness in the vehicle width direction.

An opening 36K penetrating through the vehicle width direction is formed in the longitudinal center of the step-support bracket 30 in the vertical direction. The opening 36K is a space partitioned by the rear surface 31f2 of the front wall part 31, the lower surface 32f2 of the upper wall part 32, the upper surface 33f1 of the lower wall part 33, and the front surface 34f1 of the joint part 34. The opening 36K has an outer shape substantially similar to an outer shape of the step-support bracket 30 in the right side view, and is formed in a triangular shape that is projected rearward.

Note that the opening 36K is not limited to penetrate through the vehicle width direction, and may be formed in a recessed shape that is opened into at least one of an outer side and an inner side in the vehicle width direction.

As shown in FIG. 2, front portions (the front upper end 30a and the front lower end 30b) of the step-support bracket 30 are attached to the pivot bracket 11. On the right side of the vehicle body, a muffler stay 24c for supporting the muffler 24b is attached to a rear top portion 30c of the step-support bracket 30.

The main steps 18 and the pillion steps 19 are supported on the step-support bracket 30.

The main steps 18 are attached to a lower part of the front wall part 31.

The pillion steps 19 are attached to the joint part 34 behind the main steps 18. On the right side of the vehicle body, the pillion step 19 is arranged above and in front of the muffler 24b.

Figure 4:
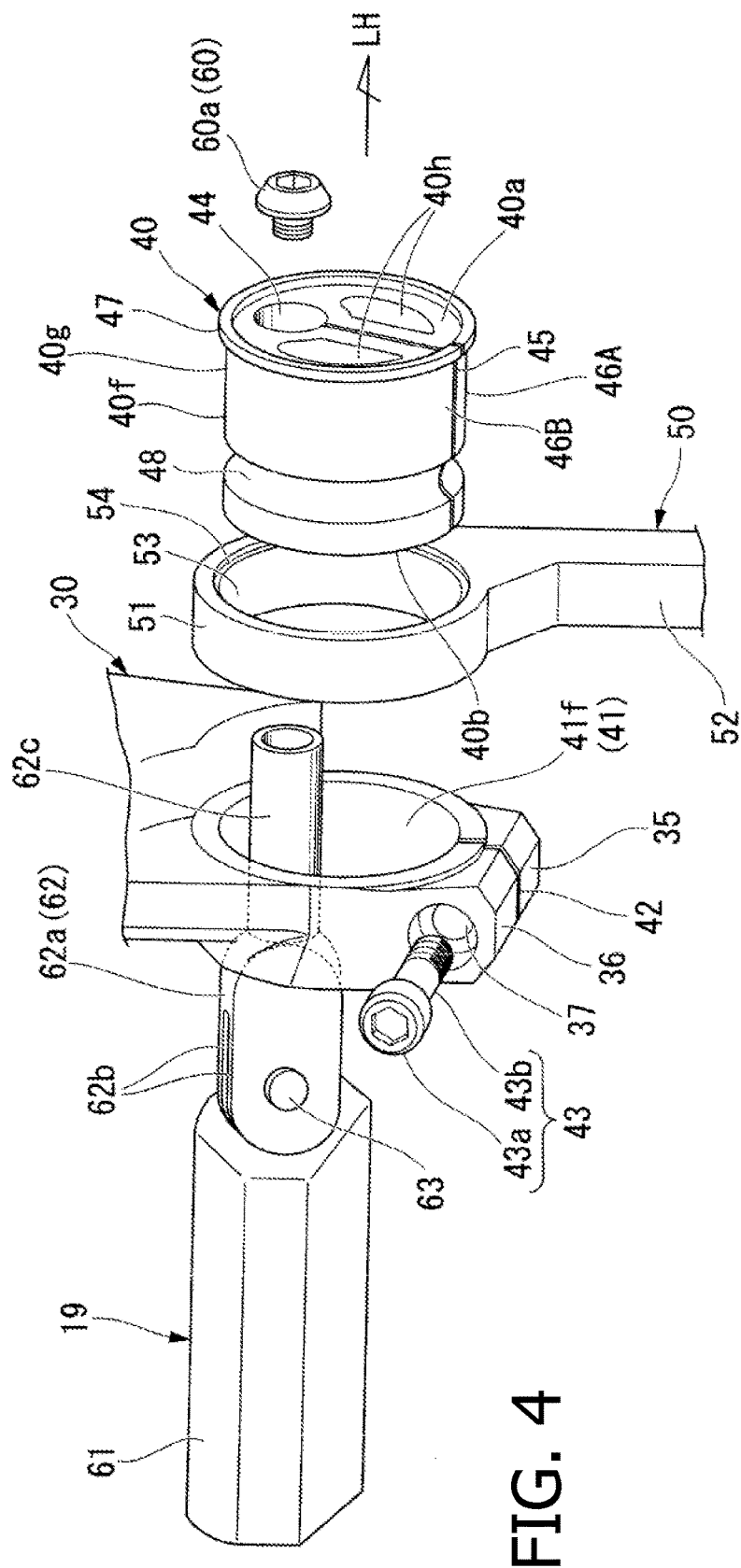
FIG. 4 is a perspective developed view showing a component structure of a rear end of the bracket.

As shown in FIG. 3 and FIG. 4, the pillion step 19 is attached to the step-support bracket 30 through an eccentric collar (rotor) 40.

Note that in the depicted embodiment, although a characteristic structure is applied to a side of the pillion step 19, the characteristic structure can be applied to also a side of the main step 18.

The eccentric collar 40 is inserted into a through hole 41 formed in the joint part 34 of the step-support bracket 30. The through hole 41 is formed in a circular shape in a side view, and penetrates through the step-support bracket 30 in the vehicle width direction.

The joint part 34 of the step-support bracket 30 is formed with a slit 42 for allowing the through hole 41 and a rear end surface 34r of the joint part 34 to communicate with each other. The slit 42 is successively formed in a substantially horizontal direction.

By the slit 42, the joint part 34 is formed with an upper clamp piece (rotor fixing part) 35 on an upper side of the slit 42 and a lower clamp piece (rotor fixing part) 36 on a lower side of the slit 42, the upper clamp piece and the lower clamp piece being opposed to each other across the slit 42. The upper clamp piece 35 and the lower clamp piece 36 are formed to extend rearward of the vehicle body from the through hole 41.

An upper surface 35f1 and a lower surface 35f2 of the upper clamp piece 35 and a lower surface 36f1 and an upper surface 36f2 of the lower clamp piece 36 are respectively formed to have a flat surface.

The lower clamp piece 36 is formed with a bolt insertion hole 37 that penetrates in the vertical direction so as to connect the upper surface 36f2 and the lower surface 36f1.

The upper clamp piece 35 is formed with a female screw hole 38 from the lower surface 35f2 toward the upper side. The female screw hole 38 is formed in such a manner that a central axis of the female screw hole 38 and a central axis of the bolt insertion hole 37 are substantially matched with each other. It is not a problem whether or not the female screw hole 38 penetrates in the vertical direction.

A fastening bolt (fastening member) 43 is inserted into the bolt insertion hole 37 and the female screw hole 38. The fastening bolt 43 is integrally provided with a head part 43a, and a male screw part 43b that extends from the head part 43a toward one side. The fastening bolt 43 is configured in such a manner that the male screw part 43b is made to penetrate through the bolt insertion hole 37 formed in the lower clamp piece 36 from below, and is screwed into the female screw hole 38 formed in the upper clamp piece 35.

Here, the bolt insertion hole 37 and the female screw hole 38 partially communicate with the through hole 41, and an inner peripheral surface 41f of the through hole 41 is partially cut out. With this arrangement, as shown in also FIG. 6, when the male screw part 43b of the fastening bolt 43 is inserted into the bolt insertion hole 37 and the female screw hole 38, a part of the male screw part 43b of the fastening bolt 43 juts in the through hole 41.

With reference to FIG. 3 and FIG. 4, when the fastening bolt 43 screwed into the female screw hole 38 through the bolt insertion hole 37 is fastened, the upper clamp piece 35 and the lower clamp piece 36 are pulled toward each other in a direction where they are made to approach each other by axial force of the fastening bolt. Then, the upper clamp piece 35 and the lower clamp piece 36 are elastically deformed in a direction where the slit 42 is sandwiched. With this arrangement, an inner diameter of the inner peripheral surface 41f of the through hole 41 is reduced, and a length in the peripheral direction is reduced.

Also, to the contrary, when the fastening bolt 43 is unfixed, the axial force of the fastening bolt is weakened, the upper clamp piece 35 and the lower clamp piece 36 are restored in a direction where elastic deformation is recovered, and the slit 42 is broadened. With this arrangement, the inner diameter of the inner peripheral surface 41f of the through hole 41 is enlarged, and the length in the peripheral direction is increased.

The eccentric collar 40 is formed in a substantially cylindrical shape, and is inserted into the through hole 41 while the central axis of the eccentric collar is matched with the vehicle width direction. At this time, the shaft center of the eccentric collar 40 is made to serve as a rotational center C2 of the eccentric collar 40 in the through hole 41. Note that the rotational center C2 of the eccentric collar 40 is not limited to be parallel to the vehicle width direction, and may be angled.

In the eccentric collar 40, a shaft insertion hole (step-receiving aperture) 44 that penetrates through the eccentric collar 40 while being parallel to the rotational center C2 is formed in a position being offset in the radial direction from the central axis of the eccentric collar.

Also, the eccentric collar 40 is formed with a slit 45 for allowing the shaft insertion hole 44 having a circular shape in the side view to communicate with an outer peripheral surface 40f of the eccentric collar 40. The slit 45 is passed through the central axis of the eccentric collar 40 from the shaft insertion hole 44 and is linearly formed to the outer peripheral surface 40f of the eccentric collar 40. With this arrangement, in the eccentric collar 40, step fixing parts 46A, 46B that extend along the slit 45 from a side of the shaft insertion hole 44 are formed on both sides of the slit 45.

In the eccentric collar 40, lightening cutout portions 40h that allow the eccentric collar 40 to open to the outside in the vehicle width direction are respectively formed on both sides of the slit 45.

Figure 6:
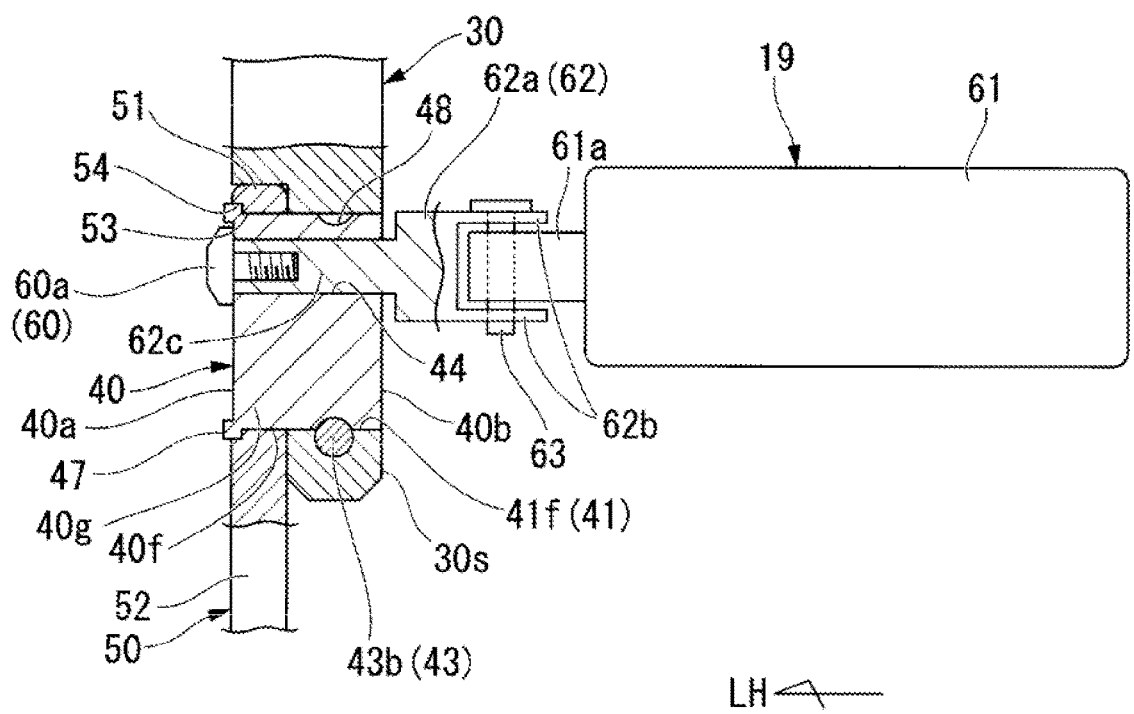
FIG. 6 is a view when viewed from an arrow VI in FIG. 5, including a cross-sectional surface of the rear end of the bracket.

As shown in FIG. 6, the eccentric collar 40 has the length in the vehicle width direction set longer than that of the through hole 41. With this arrangement, with the eccentric collar 40 attached to the step-support bracket 30, a side of one end 40a of the eccentric collar 40 on the inner side in the vehicle width direction is projected inward in the vehicle width direction from the through hole 41.

At this time, the other end 40b of the eccentric collar 40 on the outer side in the vehicle width direction is substantially flush with an outer surface 30s of the step-support bracket 30. A portion of the eccentric collar 40, that is projected inward in the vehicle width direction from the step-support bracket 30, is made to serve as a rotation support part 40g enabling a side bag support member (mounting member support part) 50 described later to rotate.

Also, in the eccentric collar 40, the one end 40a on the inner side in the vehicle width direction is formed with a flange part (projecting part) 47 that has an outside dimension larger than an outside dimension of the outer peripheral surface 40f of the eccentric collar 40 and that is continuous with the peripheral direction of the eccentric collar 40.

Further, in the outer peripheral surface 40f of the eccentric collar 40, a peripheral groove (groove part) 48 that is continuous with the peripheral direction of the outer peripheral surface 40f is formed in a position situated nearer the other end 40b in an intermediate part in the vehicle width direction.

With the eccentric collar 40 attached to the step-support bracket 30, in the peripheral groove 48 formed in the outer peripheral surface 40f of the eccentric collar 40, the male screw part 43b of the fastening bolt 43 that juts in the through hole 41 from the bolt insertion hole 37 and the female screw hole 38 is entered into a part of the peripheral groove 48 in the peripheral direction. With this arrangement, displacement of the eccentric collar 40 in the vehicle width direction while being inserted into the through hole 41 is restricted, and the eccentric collar 40 is positioned in the vehicle width direction.

As shown in FIG. 3 to FIG. 6, the side bag support member 50 for supporting each side bag SB as the mounting member mounted on the vehicle body is provided on the inner side in the vehicle width direction of the step-support bracket 30. The side bag SB has an upper part formed with locking claws t (see FIG. 1). The locking claws t are locked to each of the seat rails 12, thereby the side bag SB is fixed to each of the seat rails 12 while a load thereof is supported. The side bag support member 50 mainly suppresses horizontal slippage of a lower part of the side bag SB.

The side bag support member 50 integrally has an annular ring part 51, and an arm part 52 that extends in a tangent direction from an outer peripheral part of the ring part 51.

The ring part 51 is formed with a through hole 53 penetrating in the vehicle width direction. An inner diameter of the through hole 53 is formed to have such a size as to be rotatably fitted around the eccentric collar 40, and is set to be smaller than an outer diameter of the flange part 47 of the eccentric collar 40.

The ring part 51 is formed with a stepped groove part 54 that is provided on one side in the vehicle width direction in the through hole 53, that has an inner diameter larger than the through hole 53, and that is continuous with the peripheral direction of the through hole 53. The inner diameter of the stepped groove part 54 is set to be larger than the outer diameter of the flange part 47 of the eccentric collar 40.

The eccentric collar 40 is inserted into the through hole 41 formed in the step-support bracket 30 from the inner side in the vehicle width direction through the through hole 53 formed in the side bag support member 50. With the eccentric collar 40 attached to the step-support bracket 30, the flange part 47 of the eccentric collar 40 is engaged with the stepped groove part 54 of the side bag support member 50.

The side bag support member 50 is rotatably supported in the peripheral direction along the rotation support part 40g of the eccentric collar 40 by the rotation support part 40g set between the step-support bracket 30 and the flange part 47 of the eccentric collar 40 positioned in the vehicle width direction. The side bag support member 50 is sandwiched between the step-support bracket 30 and the flange part 47 of the eccentric collar 40, so that the displacement of the side bag support member in the vehicle width direction is restricted.

Figure 5:
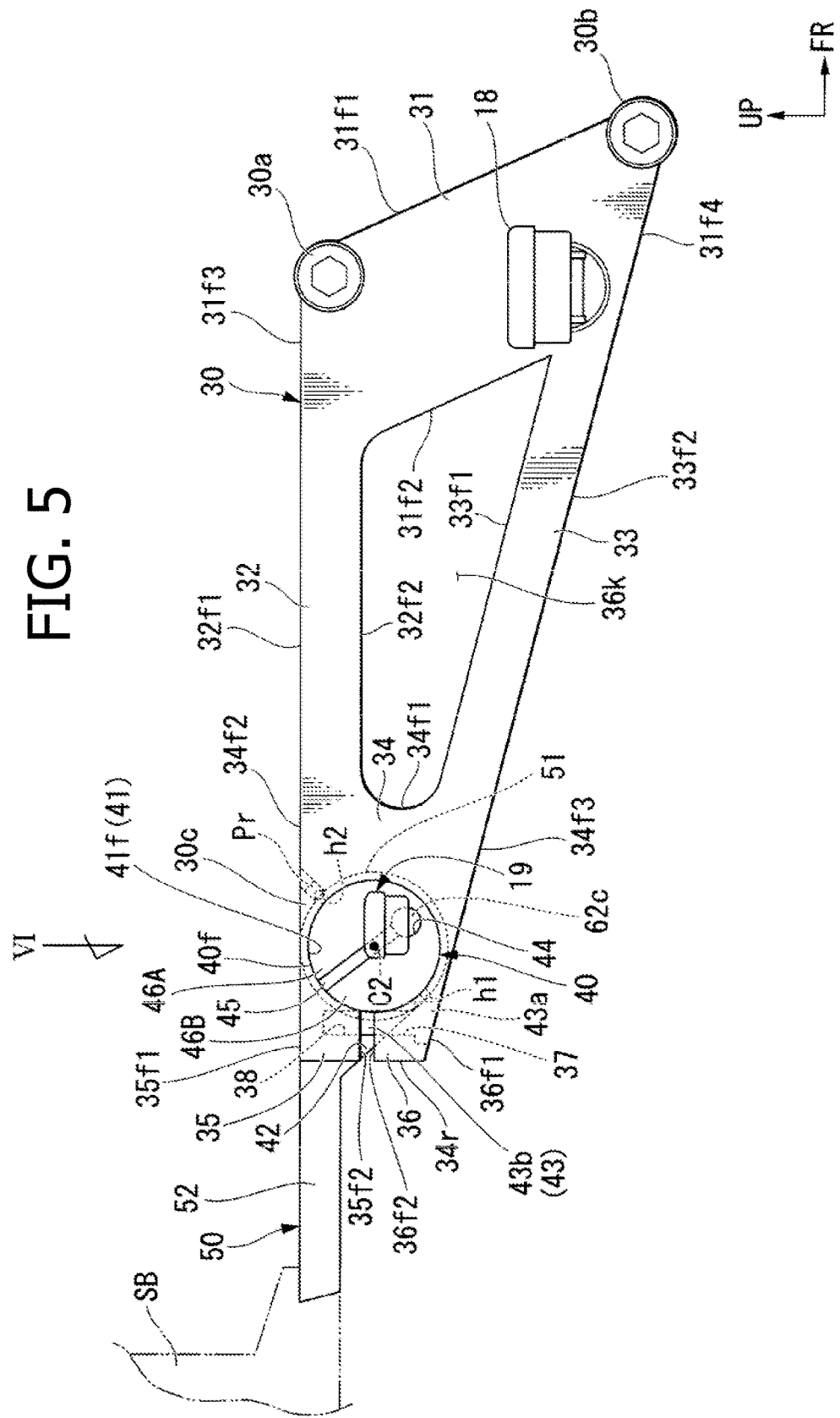
FIG. 5 is a right side view showing a state where a side bag supporting member is projected from the bracket.

With reference to FIG. 3 and FIG. 5, the side bag support member 50 is rotated in the peripheral direction along the rotation support part 40g of the eccentric collar 40, thereby switching the usage state shown in FIG. 5 and the storage state shown in FIG. 3.

Here, "the usage state of the side bag support member 50" means a state where the side bag support member 50 projects toward the rear of the vehicle body. Also, "the storage state of the side bag support member 50" means a state where the side bag support member 50 extends along the lower wall part 33 on the inner side in the vehicle width direction with respect to the step-support bracket 30.

For example, an upper front part of the joint part 34 is provided with a stopper mechanism that is engaged with the ring part 51 of the side bag support member 50 and that elastically retains the side bag support member 50 in the usage state and the storage state respectively. The stopper mechanism is configured in such a manner that, for example, a plunger Pr provided to the upper front part of the joint part 34 is engaged in the usage state and the storage state respectively with recessed parts h1, h2 formed in the outer periphery of the ring part 51 of the side bag support member 50. With this arrangement, the rotation of the side bag support member 50 is restricted in each state.

Note that as the stopper mechanism, such a structure may be employed that when, for example, a stopper is projected with respect to the side bag support member 50 and the side bag support member 50 is rotated along the rotation support part 40g of the eccentric collar 40, the stopper abuts on an appropriate part of the step-support bracket 30, thereby restricting a rotational range of the side bag support member 50.

With reference to FIG. 6, the pillion step 19 has a step body 61 and a support bracket 62.

The step body 61 is integrally formed with a support base part 61a that extends toward the inner side in the vehicle width direction.

The support bracket 62 is integrally provided with a base part 62a, a pair of side plate parts 62b that extend toward the outer side in the vehicle width direction at intervals from the base part 62a, and a shaft part (support shaft) 62c that extends toward the inner side in the vehicle width direction from the base part 62a.

The support base part 61a of the step body 61 is inserted and arranged between the pair of side plate parts 62b. Then, the support base part 61a is coupled rotatably about a connecting shaft 63 to the pair of side plate parts 62b through the connecting shaft 63 that extends in a direction perpendicular to the vehicle width direction.

The pillion step 19 configured in this manner is the so-called folding type because the step body 61 is rotated around the connecting shaft 63 with respect to the support bracket 62, thereby switching the usage state and the storage stage. Note that "the usage state of the pillion step 19" means a state where the pillion step 19 is raised in the vehicle width direction and can receive a load from above. Also, "the storage state of the pillion step 19" means a state where the pillion step 19 is rotated so as to be flipped up in an upwardly rear direction and is folded up so as to be arranged along a side surface of the vehicle body.

With reference to FIG. 4 and FIG. 6, the pillion step 19 is provided with the support bracket 62 having the shaft part 62c that is inserted into the shaft insertion hole 44 formed in the eccentric collar 40 inserted into the through hole 41. The shaft part 62c has an end projecting toward a side of the one end 40a of the eccentric collar 40, and a bolt (vehicle-width-direction movement restriction member) 60 is fastened to the end. The bolt 60 has a head part 60a having an outer diameter larger than an inner diameter of the shaft insertion hole 44. Thereby, the displacement of the pillion step 19 toward the outer side in the vehicle width direction is restricted by the head part 60a of the bolt 60.

Note that the displacement of the pillion step 19 toward the outer side in the vehicle width direction may be restricted by sandwiching a washer having a diameter larger than the shaft insertion hole 44 between the head part 60a of the bolt 60 and the eccentric collar 40.

Figure 7:
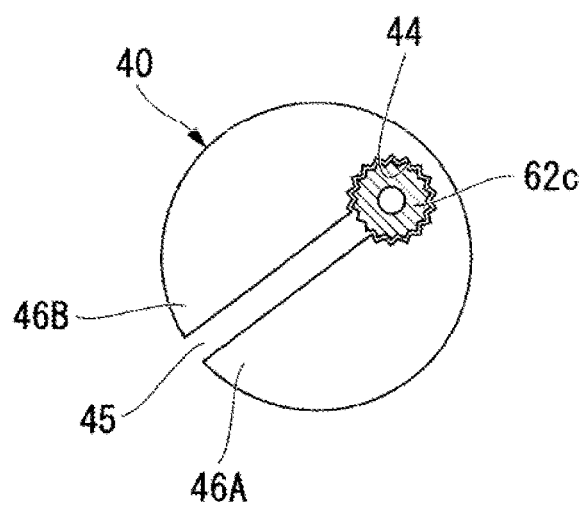
FIG. 7 is a side view showing a structure for restricting a rotational angle between an eccentric collar of the bracket and a support shaft of the step.

Note that a rotational angle restriction structure may be employed. The rotational angle restriction structure is configured in such a manner that as shown in FIG. 7, serrations and the like are formed with respect to the shaft insertion hole 44 and the shaft part 62c, and the rotational angle around the shaft part 62c of the pillion step 19 is positioned in a stepwise fashion. In this regard, a need to take and put the shaft part 62c out of and in the shaft insertion hole 44 may be created.

As the rotational angle restriction structure configured in this manner, other mechanisms such as a notch mechanism using a plunger and a ratchet mechanism using a locking claw may be provided.

In the step structure for the motorcycle 1 configured in this manner, when the fastening bolt 43 for fastening the step-support bracket 30 is unfixed, the upper clamp piece 35 and the lower clamp piece 36 are separated from each other to broaden the slit 42, and the inner diameter of the inner peripheral surface 41f of the through hole 41 is increased. Then, the eccentric collar 40 can be rotated around the central axis of the through hole 41 in the through hole 41, and the position of the pillion step 19 can be adjusted.

Also, when the inner diameter of the through hole 41 is increased, the step fixing parts 46A, 46B are separated from each other in the through hole 41 to broaden the slit 45 formed in the eccentric collar 40, and the inner diameter of the shaft insertion hole 44 is increased. Then, the shaft part 62c of the pillion step 19 can be rotated around the central axis in the shaft insertion hole 44, and a direction (angle) of the pillion step 19 around the central axis of the shaft part 62c can be adjusted.

On the other hand, when the fastening bolt 43 is fastened, the upper clamp piece 35 and the lower clamp piece 36 approach each other to narrow the slit 42, and the inner diameter of the inner peripheral surface 41f of the through hole 41 is reduced. With this arrangement, the eccentric collar 40 in the through hole 41 is fastened while being sandwiched between the upper clamp piece 35 and the lower clamp piece 36. By this binding, the eccentric collar 40 is constrained within the through hole 41, and the position of the pillion step 19 is fixed.

Also, when the eccentric collar 40 is fastened, the step fixing parts 46A, 46B approach each other to narrow the slit 45 formed in the eccentric collar 40, and the inner diameter of the shaft insertion hole 44 is reduced. With this arrangement, the shaft part 62c of the pillion step 19 in the shaft insertion hole 44 is constrained while being sandwiched between the step fixing parts 46A, 46B, and the direction (angle) of the pillion step 19 around the central axis of the shaft part 62c is fixed.

Here, with reference to FIG. 3, an interval W1 of the slit 42 formed in the step-support bracket 30 with no fastening bolt 43 fastened is set to be the same as an interval W2 of the slit 45 formed in the eccentric collar 40 or wider than the interval W2 (W1≥W2).

With this arrangement, when the fastening bolt 43 is fastened, the slit 42 is sandwiched and the eccentric collar 40 is fixed in the through hole 41. For this reason, the slit 45 formed in the eccentric collar 40 is certainly sandwiched, and the angle of the pillion step 19 is fixed in the shaft insertion hole 44.

With the above-described structure, since the pair of upper clamp piece 35 and the lower clamp piece 36 is fastened by the fastening bolt 43, the eccentric collar 40 is non-rotatably fixed, and also the shaft portion 62c of the step 19 is non-rotatably fixed in the shaft insertion hole 44. Also, when the fastening of the pair of upper clamp piece 35 and the lower clamp piece 36 by the fastening bolt 43 is canceled, the eccentric collar 40 is unfixed, and also the step 19 inserted into the shaft insertion hole 44 can be rotated around the shaft part 62c. In this way, the fixing and unfixing of the eccentric collar 40 and the pillion step 19 can be performed by the fastening bolt 43 only. For this reason, the position and angle of the pillion step 19 can be easily adjusted.

Also, the eccentric collar 40 is provided with a pair of step fixing parts 46A, 46B that are provided on the outer side in the radial direction of the shaft part 62*c* and that are provided to sandwich the shaft part 62*c* from both sides in the radial direction. With this arrangement, when the pair of upper clamp piece 35 and lower clamp piece 36 is fastened by the fastening bolt 43 to non-rotatably fix the eccentric collar 40, the shaft part 62*c* can be non-rotatably fixed while the shaft part 62*c* is sandwiched between the pair of step fixing parts 46A, 46B.

Then, the interval W1 between the pair of upper clamp piece 35 and lower clamp piece 36 is set to be wider than the interval W2 between the pair of step fixing parts 46A, 46B. With this arrangement, when the pair of upper clamp piece 35 and lower clamp piece 36 is fastened, the shaft part 62*c* can be certainly non-rotatably fixed while the shaft part 62*c* is sandwiched between the pair of step fixing parts 46A, 46B. For this reason, the eccentric collar 40 and the pillion step 19 can be reliably fixed at the same time.

Further, the peripheral groove 48 continuous with the peripheral direction is formed in the outer peripheral part of the eccentric collar 40, and the fastening bolt 43 is positioned in the peripheral groove 48. With this arrangement, while the position of the eccentric collar 40 in the vehicle width direction is restricted, the eccentric collar 40 can be rotated while being guided.

Also, the side bag support member 50 that supports the side bag SB mounted on the vehicle body frame 5 is provided rotatably between the storage state where the side bag support member is stored in the position overlapping with the step-support bracket 30 in the side view and the usage state where the side bag support member projects from the step-support bracket 30 and supports the mounting member.

With this arrangement, when the side bag support member 50 is rotated from the storage state so as to be brought into the usage state, the side bag SB can be supported by the side bag support member 50. Also, when the side bag support member 50 is not used, the side bag support member 50 is rotated from the usage state so as to be brought into the storage state, and is stored in the position overlapping with the step-support bracket 30. As a result, appearance quality can be improved.

Also, the eccentric collar 40 is provided with the rotation support part 40*g* that projects and extends from the step-support bracket 30 to the inner side in the vehicle with direction of the vehicle body frame 5 and that rotatably supports the side bag support member 50. In this way, since the side bag support member 50 is rotatably supported by the eccentric collar 40, the number of components is reduced, so that the structure can be simplified, and a reduction in costs can be achieved.

Also, the flange part 47 projecting on the side of the outer periphery is formed at the end of the rotation support part 40*g* on the inner side in the vehicle width direction, and the side bag support member 50 is rotatably supported while the movement thereof in the vehicle width direction is restricted, between the step-support bracket 30 and the flange part 47.

In this way, the side bag support member 50 can be rotatably supported between the step-support bracket 30 and the flange part 47. For this reason, also in view of this, the number of components is reduced, so that the structure can be simplified, and the reduction in costs can be achieved.

Also, with the step body 61 formed as the folding type with respect to the shaft part 62*c* and the shaft part 62*c* inserted into the step-receiving aperture 44, while the movement in the vehicle width direction is restricted by the bolt 60, the support shaft 62*c* is rotatably supported around the support shaft 62*c*. Also in view of this, the structure can be simplified, and the reduction in costs can be achieved.

Also, the rotational angle of the shaft part 62*c* around the shaft part 62*c* can be positioned in the stepwise fashion. With this arrangement, the rotational angle of the shaft part 62*c* can be easily positioned, and the angle of the pillion step 19 can be easily adjusted.

Note that the present invention is not limited to the above-mentioned embodiments described with reference to the drawings, and various modifications may be made within the technical scope.

For example, in the above-mentioned embodiment, the pillion step 19 has been exemplarily described as the step; however, this is not limited. For example, as the step, the main step 18 may be applied, and the respective main step 18 and pillion step 19 may be applied.

Also, the step-support bracket 30 is fixed to the vehicle body frame 5 as a main constitution of the vehicle body; however, the step-support bracket 30 may be fixed to the other member composing the vehicle body if the bracket can be certainly fixed to the member such as a frame member provided separately from the vehicle body frame 5 and a structure such as the engine 21. Also, the bracket may be integrally provided to the vehicle body.

The mounting member support part exemplified as the side bag support member 50 may support various kinds of optional components such as exterior components and electric components in addition to the bag and the case.

Further, in the above-mentioned embodiment, the eccentric collar 40 is provided with the pair of step fixing parts 46A, 46B sandwiching the shaft part 62*c* from both the sides in the radial direction; however, this is not limited.

If the shaft part 62*c* of the step 19 is non-rotatably fixed in the shaft insertion hole 44 with the eccentric collar 40 non-rotatably fixed, the other configuration can be appropriately employed. For example, the configuration may be the chuck mechanism for the so-called drill bit, the chuck mechanism being configured such that a plurality of chuck members are made to approach toward and/or are separated from the shaft part 62*c*, and the shaft part 62*c* is non-rotatably fixed by the plurality of chuck members. Note that in this case, the structure of the eccentric collar 40 is easily complicated.

Also, the saddle-ride vehicle includes all the vehicles configured such that the rider rides the vehicle while striding over the vehicle body, includes not only motorcycles (including motorized bicycles and scooter type vehicles) but also three-wheeled vehicles (including vehicles having two front wheels and one rear wheel in addition to vehicles having one front wheel and two rear wheels) or four-wheel vehicles, and also includes vehicles including the electric motor as the motor.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A step structure for a saddle-type vehicle, said step structure comprising:
   a step-support bracket that is provided on a vehicle body of the saddle-type vehicle;
   a rotor that is rotatably retained by the step-support bracket, the rotor extending in a vehicle width direction and having a step-receiving aperture formed therein which is offset with respect to a rotational center of the rotor;
   the step-support bracket comprising a pair of clamp members that are provided to sandwich the rotor from both sides thereof in a radial direction of the rotor;
   a fastening member engaged with the step-support bracket and that is configured to be tightened to move the clamp members toward each other;
   a mounting member support part configured to selectively engage a mounting member detachably mounted on a rear side of vehicle body for restricting movement of the mounting member inwardly of the vehicle, and
   a step that has a support shaft extending in the vehicle width direction and inserted into the step-receiving aperture, and a step body projecting outward from the support shaft in the vehicle width direction,
   wherein the clamp members non-rotatably fix a position of the rotor when they are urged toward one another by the fastening member, and
   wherein the rotor is configured such that when the position of the rotor is fixed by tightening the fastening member, a position of the support shaft of the step is also non-rotatably fixed in the step-receiving aperture, and when the fastening member is loosened and the rotor is released, the step supported by the step-receiving aperture is pivotally adjustable by moving the step around the support shaft,
   wherein the mounting member support part is rotatably adjustable between a storage state thereof, where the mounting member support part is stored in a position overlapping with the step-support bracket in a side view, and an extended state thereof, where the mounting member support part projects from the step-support bracket in side view and restricts the mounting member from moving inwardly of the vehicle.

2. The step structure for a saddle-type vehicle according to claim 1,
   wherein the rotor has a pair of step-fixing parts that are provided to sandwich the support shaft in the step-receiving aperture from both the sides in the radial direction, and
   wherein the step-fixing parts are configured such that when the position of the rotor is non-rotatably fixed by the pair of clamp members, the position of the support shaft is also non-rotatably fixed by being sandwiched between the step-fixing parts.

3. The step structure for a saddle-type vehicle according to claim 2, wherein an interval W1 between the pair of clamp members and an interval W2 between the pair of step-fixing parts have a relationship of "W1≥W2".

4. The step structure for a saddle-type vehicle according to claim 1, wherein a groove part is formed in an outer peripheral part of the rotor and extending in a peripheral direction, and wherein a portion of the fastening member attached to the step-support bracket is entered into the groove part.

5. The step structure for a saddle-type vehicle according to claim 1, wherein the rotor has a rotation support part that projectingly extends inward in the vehicle width direction from the step-support bracket and that rotatably supports the mounting member support part.

6. The step structure for a saddle-type vehicle according to claim 5, wherein a projecting flange part projecting to a side of an outer periphery is formed on an inner side of the rotation support part in the vehicle width direction,
   and wherein the mounting member support part is rotatably supported while movement thereof in the vehicle width direction is restricted, between the step-support bracket and the projecting flange part.

7. The step structure for a saddle-type vehicle according to claim 1,
   wherein the step body is foldable with respect to the support shaft,
   and wherein the support shaft is configured so that when the support shaft is inserted into the step-receiving aperture, movement of the support shaft in the vehicle width direction is restricted by a vehicle-width-direction movement restriction member, and the support shaft is rotatably supported in the step-receiving bracket.

8. The step structure for a saddle-type vehicle according to claim 1, wherein the support shaft and the step-receiving aperture are respectively configured such that a turning angle of the support shaft in the step-receiving aperture is positioned in a stepwise fashion.

9. A saddle-type vehicle comprising the step structure according to claim 1.

10. The step structure for a saddle-type vehicle according to claim 2, wherein the rotor is substantially cylindrical in shape, and has a slit formed therein extending from the step-receiving aperture through a central axis of the rotor, and wherein the step-fixing parts are defined on opposite sides of the slit.

11. A step structure for a saddle-type vehicle, said step structure comprising:
   a step-support bracket that is provided on a vehicle body of the saddle-type vehicle, the step-support bracket having a cylindrical through hole formed therein;
   a substantially cylindrical rotor that is rotatably retained by the step-support bracket, the rotor extending in a vehicle width direction and having a step-receiving aperture formed therein which is offset with respect to a rotational center of the rotor, wherein the rotor has a slit formed therein extending from the step-receiving aperture through a central axis of the rotor, and wherein a pair of step-fixing parts are defined on opposite sides of the slit;
   the step-support bracket comprising a pair of clamp members that are provided to sandwich the rotor in the through hole from both sides thereof in a radial direction of the rotor;
   a mounting member support part configured to selectively engage a mounting member detachably mounted on a rear side of vehicle body for restricting movement of the mounting member inwardly of the vehicle;
   a fastening member engaged with the step-support bracket and that is configured to be tightened to move the clamp members toward each other;
   and
   a step that has a support shaft extending in the vehicle width direction and inserted into the step-receiving aperture, and a step body projecting outward from the support shaft in the vehicle width direction,
   wherein the clamp members non-rotatably fix a position of the rotor when they are urged toward one another by the fastening member, wherein the rotor is configured such that when the position of the rotor is fixed by tightening the fastening member, a position of the support shaft of the step is also non-rotatably fixed in the step-receiving aperture by being sandwiched between the step-fixing parts, and when the fastening member is loosened and the rotor is released, the step supported by the step-receiving aperture is pivotally adjustable by moving the step around the support shaft, and wherein the mounting member support part is rotatably adjustable between a storage state thereof, where the mounting member support part is stored in a position overlapping with the step-support bracket in a side view, and an extended state thereof, where the mounting member support part projects from the step-support bracket and restricts the mounting member from moving inwardly of the vehicle.

12. The step structure for a saddle-type vehicle according to claim 11, wherein an interval W1 between the pair of clamp members and an interval W2 between the pair of step-fixing parts have a relationship of "W1≥W2".

13. The step structure for a saddle-type vehicle according to claim 11, wherein a groove part is formed in an outer peripheral part of the rotor and extending in a peripheral direction, and wherein a portion of the fastening member attached to the step-support bracket is entered into the groove part.

14. The step structure for a saddle-type vehicle according to claim 11, wherein the rotor has a rotation support part that projectingly extends inward in the vehicle width direction from the step-support bracket and that rotatably supports the mounting member support part.

15. The step structure for a saddle-type vehicle according to claim 14, wherein a projecting flange part projecting to a side of an outer periphery is formed on an inner side of the rotation support part in the vehicle width direction, and wherein the mounting member support part is rotatably supported while movement thereof in the vehicle width direction is restricted, between the step-support bracket and the projecting flange part.

16. The step structure for a saddle-type vehicle according to claim 11, wherein the step body is foldable with respect to the support shaft, and wherein the support shaft is configured so that when the support shaft is inserted into the step-receiving aperture, movement of the support shaft in the vehicle width direction is restricted by a vehicle-width-direction movement restriction member, and the support shaft is rotatably supported in the step-receiving bracket.

17. The step structure for a saddle-type vehicle according to claim 11, wherein the support shaft and the step-receiving aperture are respectively configured such that a turning angle of the support shaft in the step-receiving aperture is positioned in a stepwise fashion.

18. A saddle-type vehicle comprising the step structure according to claim 11.

* * * * *